(12) United States Patent
Galletti et al.

(10) Patent No.: US 9,079,283 B2
(45) Date of Patent: Jul. 14, 2015

(54) METHOD AND APPARATUS FOR OPTICALLY MEASURING BY INTERFEROMETRY THE THICKNESS OF AN OBJECT

(75) Inventors: Dino Galletti, Renazzo (IT); Domenico Malpezzi, Brisighella (IT)

(73) Assignee: MARPOSS SOCIETA' PER AZIONI, Bentivoglio Bo (IT)

( * ) Notice: Subject to any disclaimer, the term of this patent is extended or adjusted under 35 U.S.C. 154(b) by 443 days.

(21) Appl. No.: 13/643,518

(22) PCT Filed: May 17, 2011

(86) PCT No.: PCT/EP2011/057987
§ 371 (c)(1),
(2), (4) Date: Oct. 25, 2012

(87) PCT Pub. No.: WO2011/144624
PCT Pub. Date: Nov. 24, 2011

(65) Prior Publication Data
US 2013/0045663 A1      Feb. 21, 2013

(30) Foreign Application Priority Data

May 18, 2010  (IT) .............................. BO2010A0313
May 18, 2010  (IT) .............................. BO2010A0318

(51) Int. Cl.
*B24B 1/00*        (2006.01)
*B24B 7/22*        (2006.01)
*B24B 37/013*      (2012.01)
(Continued)

(52) U.S. Cl.
CPC .............. *B24B 7/228* (2013.01); *B24B 37/013* (2013.01); *B24B 49/12* (2013.01); *G01B 11/0675* (2013.01); *G01B 11/0683* (2013.01)

(58) Field of Classification Search
CPC ........................ G01B 11/0675; G01B 11/0683
USPC ................. 451/5, 6, 8, 41; 356/451; 700/164; 702/155
See application file for complete search history.

(56) References Cited

U.S. PATENT DOCUMENTS

| 4,647,205 A | * | 3/1987 | Kalliomaki et al. | ........... 356/503 |
| 4,999,508 A | * | 3/1991 | Hyakumura | ............. 250/559.27 |

(Continued)

FOREIGN PATENT DOCUMENTS

| EP | 1 296 367 A1 | 3/2003 |
| JP | 5-265501 A | 10/1993 |

(Continued)

*Primary Examiner* — Maurina Rachuba
(74) *Attorney, Agent, or Firm* — Dickstein Shapiro LLP

(57) ABSTRACT

Methods and apparatuses are used for optically measuring by interferometry the thickness (T) of an object (2) such as a slice of semiconductor material. Readings of the object thickness by optical interferometry are carried out, rough thickness values (RTW) are obtained and frequencies, indicating how often the rough thickness values occur, are evaluated. A limited set of adjacent rough thickness values whose frequency integration or summation represents an absolute maximum is identified, and the actual value of the thickness of the object is determined as a function of the rough thickness values belonging to said limited set of values. The rough thickness values can be divided up into classes (C) with corresponding frequencies (F), and in this case, a preponderant group ($G_{max}$) of thickness classes is identified as the above-mentioned limited set of adjacent rough thickness. A lower reject threshold ($R_{min}$) and a higher reject threshold ($R_{max}$) that define a searching interval including the actual value of the object thickness are also determined, and all the rough thickness values that are outside the searching interval are eliminated from further processing. When measuring the object during a surface machining, the reject thresholds are progressively and automatically updated as a function of a gradual thickness reduction that the object undergoes.

31 Claims, 7 Drawing Sheets

(51) Int. Cl.
*B24B 49/12* (2006.01)
*G01B 11/06* (2006.01)

(56) References Cited

U.S. PATENT DOCUMENTS

| 6,437,868 | B1 | 8/2002 | Coult et al. |
| 2004/0147207 | A1* | 7/2004 | Muller et al. .................. 451/59 |
| 2009/0109444 | A1* | 4/2009 | Wan .............................. 356/511 |

FOREIGN PATENT DOCUMENTS

| JP | 8-216016 A | 8/1996 |
| JP | 2000-234908 A | 8/2000 |
| JP | 2001-287159 A | 10/2001 |
| JP | 2004-12302 A | 1/2004 |
| JP | 2010-43987 A | 2/2010 |
| WO | WO 02/10729 A1 | 2/2002 |
| WO | WO 2009/013231 A1 | 1/2009 |

* cited by examiner

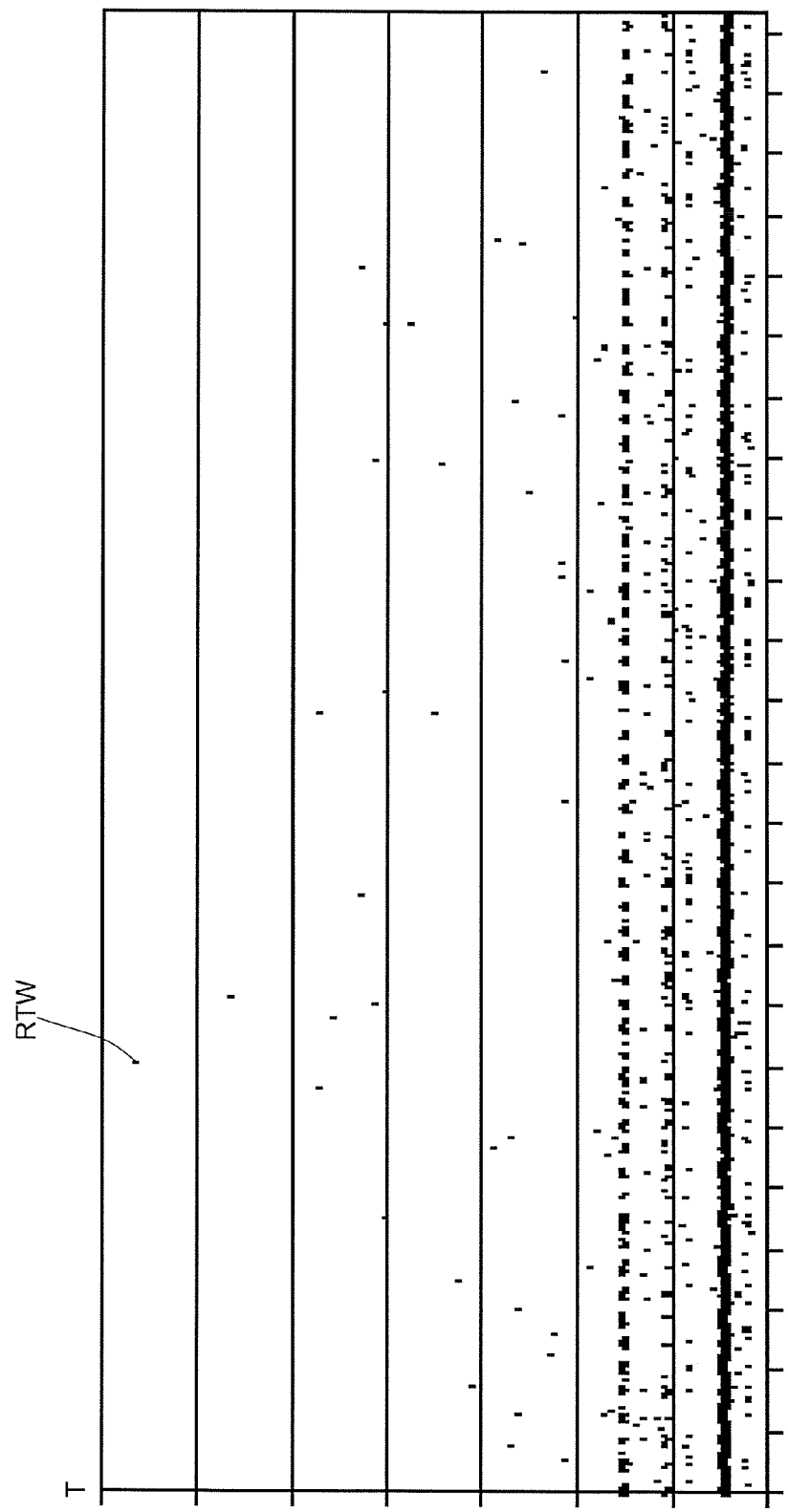

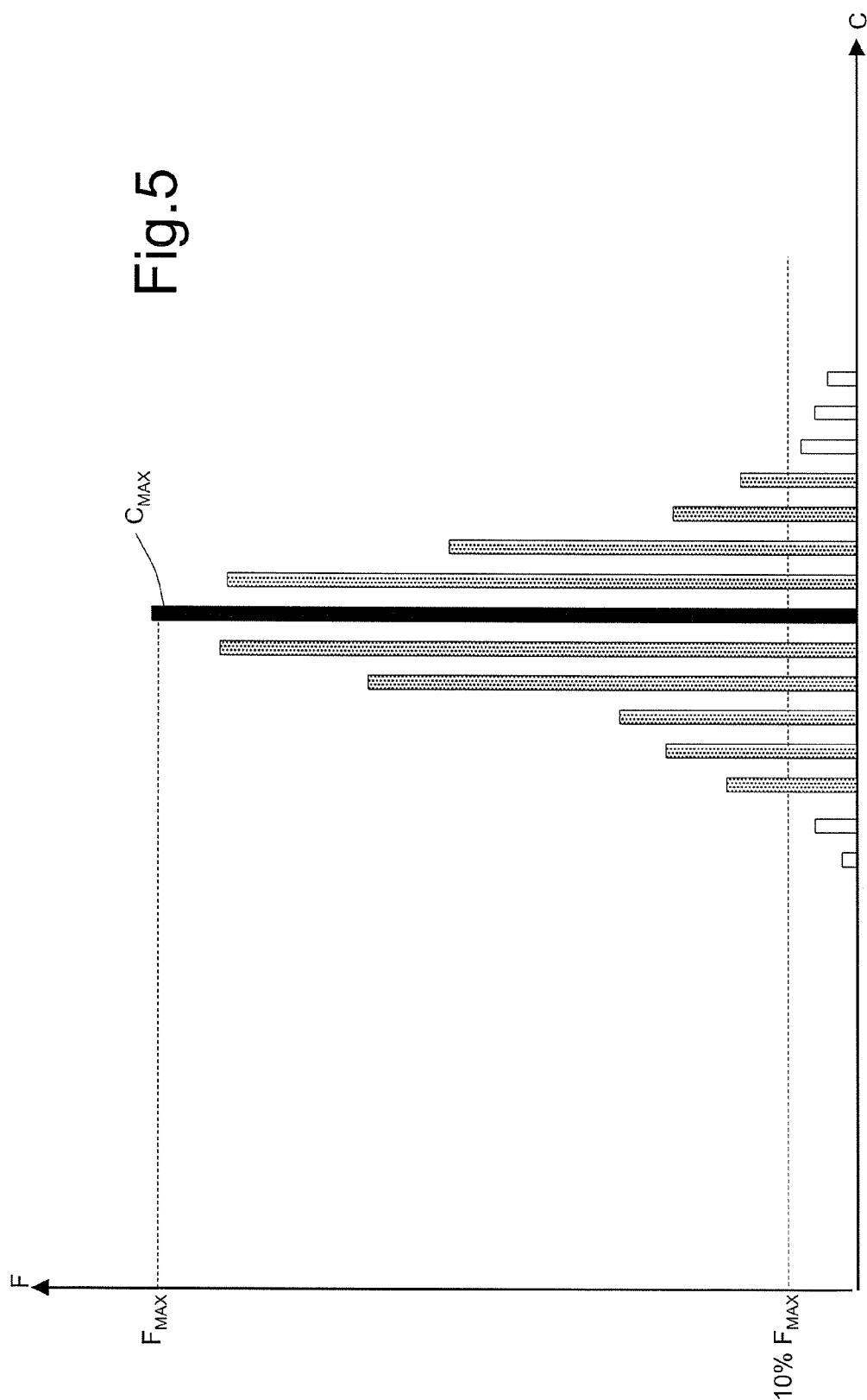

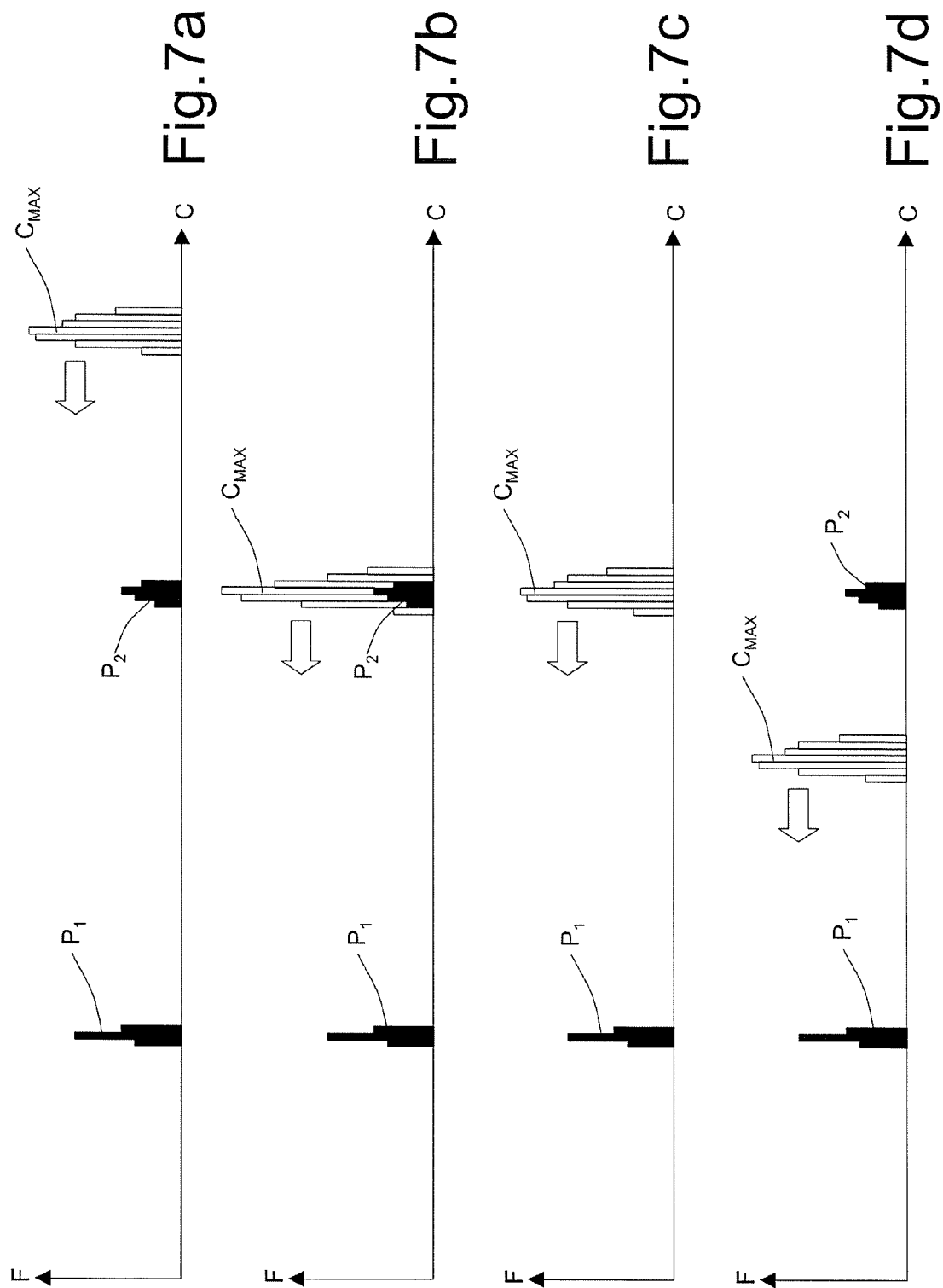

METHOD AND APPARATUS FOR OPTICALLY MEASURING BY INTERFEROMETRY THE THICKNESS OF AN OBJECT

TECHNICAL FIELD

The present invention relates to a method and an apparatus for optically measuring by interferometry the thickness of an object.

The present invention can be advantageously applied for optically measuring by interferometry the thickness of slices, or wafers, made of semiconductor material (typically silicon), to which reference will be explicitly made in the specification without loss of generality.

BACKGROUND ART

A slice of semiconductor material is machined, for example, to obtain integrated circuits or other electric components in the semiconductor material. In particular, when the slice of semiconductor material is very thin, the slice of semiconductor material is placed on a support layer (typically made of plastic material or glass) that serves to provide a higher mechanical sturdiness and thus an ease in handling.

In general it is necessary to mechanically machine the slice of semiconductor material by grinding and polishing to obtain a thickness that is uniform and equal to a desired value. In this phase of the mechanical machining of the slice of semiconductor material the thickness needs to be measured for ensuring that the desired value is accurately obtained.

For measuring the thickness of a slice of semiconductor material it is known to use gauging heads with mechanical feelers touching an upper surface of the slice of semiconductor material being machined.

This measuring technology can cause damage to the slice of semiconductor material during the measurement owing to the mechanical contact with the mechanical feelers, and does not enable to measure very thin thicknesses (typically lower than 100 micron).

For measuring the thickness of a slice of semiconductor material it is known to use capacitive probes, inductive probes (eddy current probes or other types), or ultrasound probes. These measuring technologies are of the contactless type and thus do not damage the slice of semiconductor material during the measurement and can measure the thickness of the slice of semiconductor material even when there is the support layer. However, these technologies are limited both in the dimensions they can measure and in the highest resolution they can achieve.

For overcoming the limits of the measuring technologies above described, optical probes and interferometric measurements are used. For example, the international patent application published with No. WO2009013231A1, the U.S. Pat. No. 6,437,868A1 and the Japanese patent application published with No. JP082160016A describe apparatuses for optically measuring the thickness of a slice of semiconductor material.

Some of the known apparatuses include a source of light radiations, that are mostly infrared radiations as the currently used semiconductor materials are silicon based and the silicon is sufficiently transparent to the infrared radiations, or have a wider spectrum for enabling the measurement of particularly thin thicknesses. The emitted radiation beam features a low coherence and a plurality of wavelengths within a determined band. Such apparatuses further include a spectrometer and an optical probe that is connected to the source of light radiations and to the spectrometer by means of optical fibres, faces the slice of semiconductor material to be measured, and is provided with lenses for focusing the radiations emitted by the radiation source on the slice of semiconductor material to be measured and for collecting the radiations reflected by the slice of semiconductor material to be measured. A spectral analysis of the combinations resulting from the interference of the radiations that are reflected by the external surface and by possible optical discontinuity surfaces inside the slice of semiconductor material to be measured is carried out by means of the spectrometer. From such a spectral analysis of the combinations resulting from the interference of the radiations reflected by the slice of semiconductor material it is possible to determine the measure of the thickness of one or more layers of optically homogeneous material that have been crossed by the radiations.

But the above-mentioned analysis does not enable to determine the path followed by the reflected radiations that are combined. In other words, the combinations are the end result of a plurality of reflections occurring on the external surface of the slice of semiconductor material and inside the latter at each optical discontinuity surface. But in the known apparatuses it is not possible to use information that could be present in the combinations of reflected radiations to directly or indirectly measure the distance between the optical probe and each of the discontinuity surfaces causing the reflections. As a consequence, the analysis of the combinations of radiations reflected by the slice of semiconductor material enables to determine the measure of the thickness of the layers placed between couples of optical discontinuity surfaces, but it is not possible to determine the part of the slice of semiconductor material to which the measure of the thickness has to be assigned (that is to determine whether the measure of the thickness has to be assigned to a first layer that has been crossed twice, to the first layer that has been crossed n times, to a second or third layer, or to the first layer added to the second layer, etc.).

At each reading it is not only a single radiation reflected by the slice of semiconductor material that is analyzed but a beam of radiations reflected by the slice of semiconductor material. Therefore, the measures of a plurality of different thicknesses are determined, but it is not possible to assign each measure of thickness to a specific part or layer of the slice of semiconductor material. However, for each reading it is possible to determine a corresponding quality factor on the basis, for example, of the ratio between the specific luminous power and the overall luminous power. Indeed, the quality factor is one of the clues suggesting that the associated reading corresponds to the thickness to be measured.

A known apparatus for optically measuring by interferometry the thickness of a slice of semiconductor material provides at each reading rough thickness values and associated quality factors on the basis of which they are generally arranged. In order to succeed in identifying, among all the rough thickness values provided by the apparatus, which rough thickness values correspond to the first layer of the slice of semiconductor material (i.e. the most external layer that is made of semiconductor material, is subject to grinding of polishing, and the thickness of which is to be measured) the known apparatuses use a recognition algorithm analyzing a relatively high number of consecutive readings (typically at least some tens of consecutive readings). Such known recognition algorithm considers, for each reading, only the rough thickness value with the highest quality factor. Then, all the rough thickness values with a quality factor lower than a minimum quality threshold and all the rough thickness values being lower than a minimum reject threshold or higher than a maximum reject threshold —the reject thresholds define the range within which the wanted thickness value has to lie—are rejected. Finally, the wanted thickness value (that is the measure of the thickness of the most external layer made of semiconductor material) can be determined by averaging the remaining rough thickness values.

However, some known recognition algorithms, as the one described above, have several inconveniences.

First of all, the accuracy of the known recognition algorithm described above is not optimal and extremely variable over time: the recognition algorithm is accurate when there are no foreign thickness values that are similar to the wanted thickness value, but it is much less accurate when there are foreign thickness values that are similar to the wanted thickness value.

Moreover, to obtain an acceptable accuracy, a special attention has to be paid in choosing both the minimum quality threshold and the reject thresholds serving to cut the thickness values provided by the readings. In other words, there are no minimum quality thresholds and reject thresholds that apply to all situations, but every time it is necessary to adapt the minimum quality thresholds and the reject thresholds to the specific current situation. Hence, the choice of the minimum quality thresholds and the reject thresholds requires every time the intervention of an experienced operator who is able to analyze the rough thickness values provided by the readings beforehand.

The intervention of an experienced operator is normal and thus acceptable in laboratory measurements but is not possible in measurements carried out in a production line during the serial production.

DISCLOSURE OF THE INVENTION

Object of the present invention is to provide a method and an apparatus for optically measuring by interferometry the thickness of an object that overcome the above described inconveniences and can be easily and cheaply implemented at the same time.

The present invention provides a method and an apparatus for optically measuring the thickness of an object according to what is claimed in the accompanying claims.

BRIEF DESCRIPTION OF THE DRAWINGS

The present invention is now described with reference to the enclosed sheets of drawings, given by way of non limiting examples, wherein:

FIG. 3 is a graph showing the distribution of a plurality of rough thickness values that are read as part of the measuring process of the thickness of the slice of semiconductor material;

FIG. 5 is a view showing in an enlarged scale a detail of the histogram in FIG. 4B;

FIGS. 7a to 7d display the evolution over time of a histogram that shows a series of thickness classes and relative frequencies.

BEST MODE FOR CARRYING OUT THE INVENTION

Figure 1:
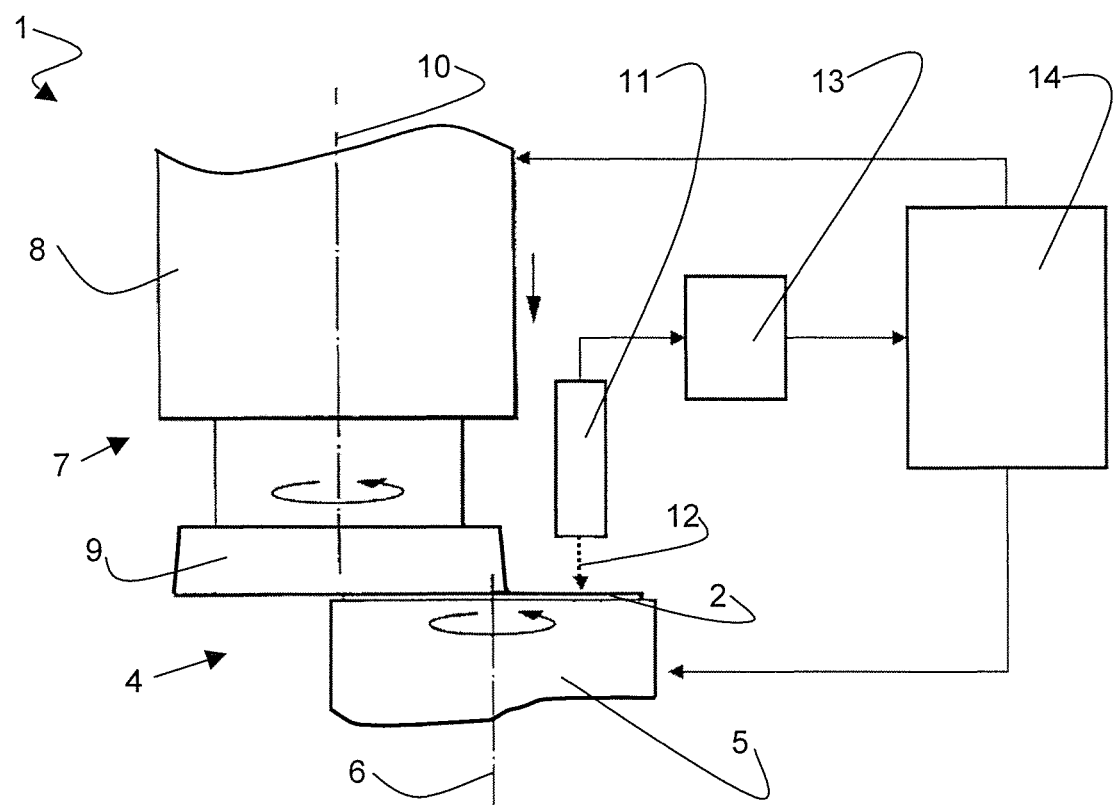
FIG. 1 is a simplified view, with some parts removed for the sake of clarity, of a machine tool that mechanically machines a slice of semiconductor material and includes an apparatus for optically measuring by interferometry the thickness of a slice of semiconductor material.
Figure 2:
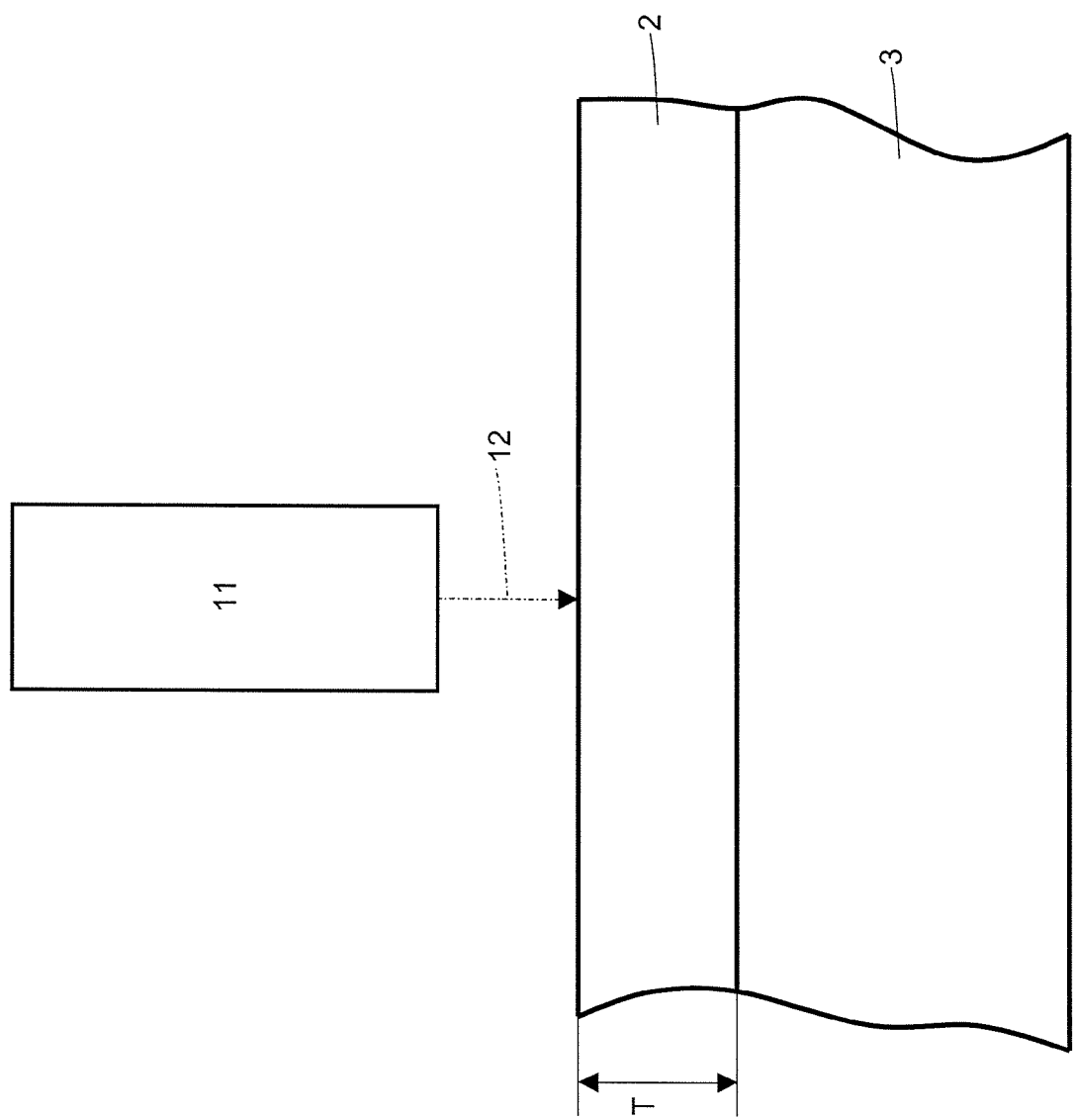
FIG. 2 is a simplified cross-section of the slice of semiconductor material of FIG. 1 while the measurement of the thickness is carried out.

In FIG. 1, the reference number 1 indicates, on the whole, a machine tool that mechanically machines an object 2, such as a slice of semiconductor material, for carrying out on the slice of semiconductor material 2 a grinding operation that causes a gradual superficial removal of material. As illustrated in FIG. 2, the slice 2 of semiconductor material is placed on a support layer 3 (typically made of plastic material or glass) that serves to provide a higher mechanical sturdiness and thus an ease in handling. According to a different embodiment, herein not illustrated, the support layer 3 is omitted.

The machine tool 1 includes a support device 4 with a motorized, rotary table 5 that is mounted so as to rotate about a vertical rotation axis 6. The slice 2 of semiconductor material is arranged on the rotary table 5 and it keeps contact with the latter e.g. by means of suction. Moreover, the machine tool 1 includes a machining head 7 with an actuating device 8 that supports a grinding tool 9 in such a way to rotate the grinding tool 9 about a vertical rotation axis 10 and to vertically move the grinding tool 9 along the rotation axis 10.

The machine tool 1 includes a measuring device 11 for optically measuring by interferometry the thickness T of the slice of semiconductor material (shown in FIG. 2). The measuring device 11 is, for example, a measuring device of the type described in the international patent application published with No. WO2009013231A1 to which reference is made for a more detailed description of the measuring device 11. The measuring device 11 includes a source of light radiations, a spectrometer and an optical probe, which is connected by means of optical fibres to the source of light radiations and to the spectrometer, faces the slice 2 of semiconductor material to be checked, and is provided with lenses for focusing a beam 12 of light radiations on the slice 2 of semiconductor material to be checked, the latter being placed on the rotary table 5, and for collecting the radiations reflected by the slice 2 of semiconductor material to be checked. By means of the spectrometer the spectrum of the combinations resulting from the interference between the light radiations reflected by the slice 2 of semiconductor material is analyzed, and from such spectral analysis it is possible to determine the measure of the thickness of the material that has been crossed by the reflected radiations.

The light radiations emitted by the radiation source are mostly infrared, as the currently used semiconductor materials are silicon based and the silicon is sufficiently transparent to the infrared radiations, or have a wider spectrum for measuring particularly thin thicknesses. The emitted radiation beam features a low coherence and a plurality of wavelengths within a determined band.

The machine tool 1 comprises a processing unit 13 that is connected to the measuring device 11 for receiving from the measuring device 11 the readings of the thickness T of the slice 2 of semiconductor material and using the readings of the thickness T of the slice 2 of semiconductor material provided by the measuring device 11 to determine the actual value of the thickness T of the slice of semiconductor material according to the method hereinafter described. Therefore, the measuring device 11 and the processing unit 13 form an apparatus for optically measuring by interferometry the thickness of the slice 2 of semiconductor material.

Figure 6:
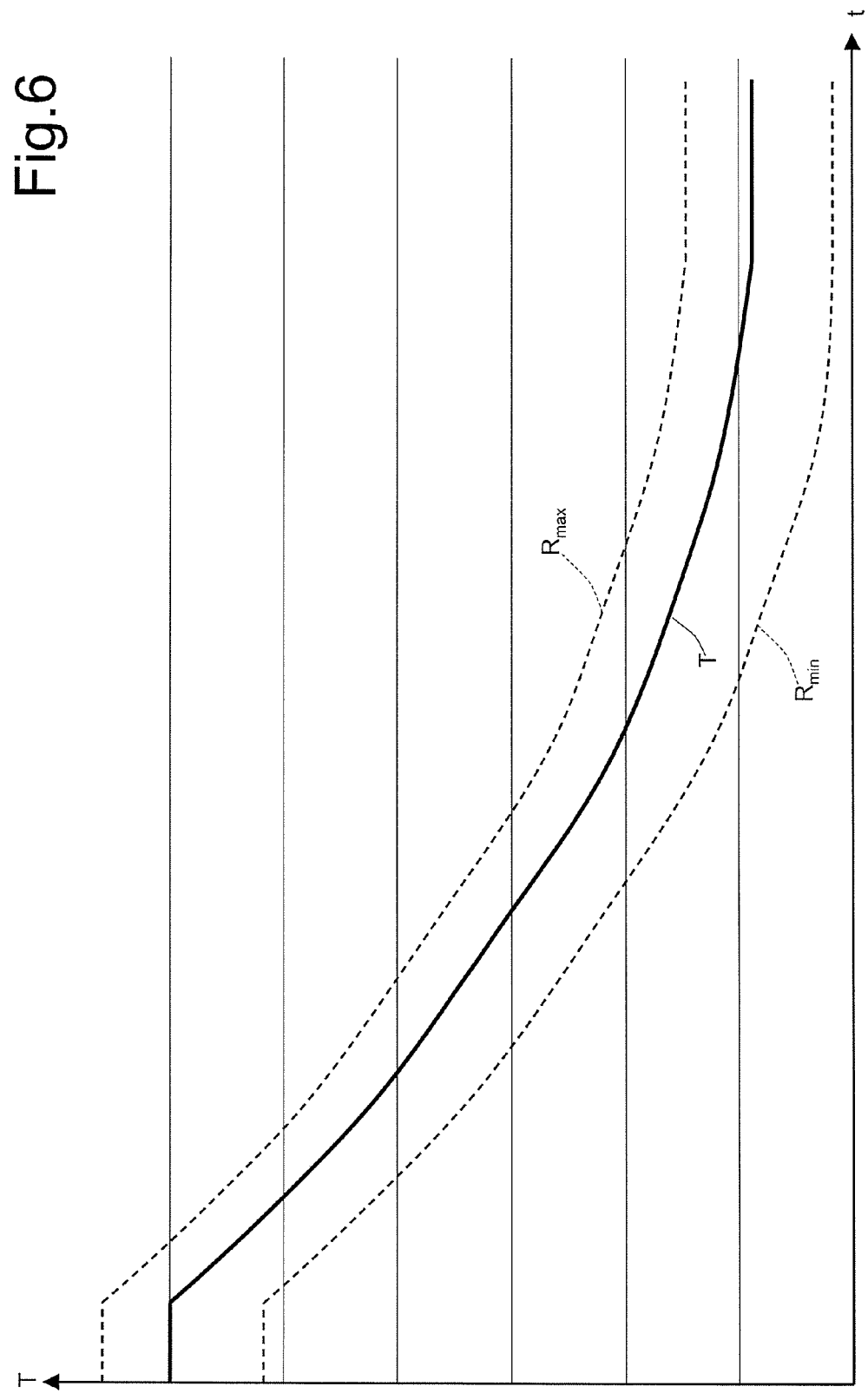
FIG. 6 is a graph showing the evolution over time of a lower reject threshold and a higher reject threshold that are used during the measurements of the thickness of the slice of semiconductor material.

Finally, the machine tool 1 includes a control unit 14 that receives from the processing unit 13 the actual value of the thickness T of the slice 2 of semiconductor material and controls, by controlling the support device 4 and the machining head 7, the grinding of the slice 2 of semiconductor material by adjusting the rotational speed of the rotary table 5, the rotational speed of the grinding tool 9, and the vertical position of the grinding tool 9. In particular, the control unit 14 controls the grinding of the slice 2 of semiconductor material for following a predefined and per se known machining process according to which, in general, the material removal rate (that is the thickness of removed material in the time unit) is gradually reduced as the thickness T of the slice 2 of semiconductor material approaches the wanted value. An example of how the thickness T of the slice 2 of semiconductor material varies over time owing to the grinding is illustrated in FIG. 6 that shows how the thickness T of the slice 2 of semiconductor material decreases faster in the first instants of the machining and decreases much more slowly in the last instants of the grinding.

At each reading of the thickness T of the slice 2 of semiconductor material, the spectrum of the combination resulting from the interference between radiations reflected by the external surface of the slice 2 of semiconductor material and by possible optical discontinuity surfaces inside the slice 2 of semiconductor material is analyzed by means of the spectrometer. From such spectral analysis it is possible to determine the measure of the thickness of one or more layers of optically homogeneous material that have been crossed by the radiations. In particular, starting from such analysis of the spectrum of the combination resulting from the interference between the reflected radiations the measuring device 11 determines a plurality of rough thickness values RTW generally differing from one another.

Indeed, starting from the analysis of a combination resulting from the interference between radiations reflected by the slice 2 of semiconductor material the measuring device 11 can determine the measure of the thickness of a material that has been crossed by the reflected radiation, but it can not determine the path that the reflected radiation has actually followed.

In other words, said combinations are generated by radiations that are the end result of a plurality of reflections occurring on the external surface of the slice 2 of semiconductor material and inside the slice 2 of semiconductor material at each optical discontinuity surface, but in the known apparatuses it is not possible to use information that could be present in the combinations of reflected radiations to directly or indirectly measure the distance between the optical probe and each of the discontinuity surfaces causing the reflections. As a consequence, the analysis of the combinations of radiations reflected by the slice 2 of semiconductor material enables to determine the measure of the thickness of the layers placed between couples of optical discontinuity surfaces, but it is not possible to determine the layer or part of the slice 2 of semiconductor material to which the measure of the thickness has to be assigned (that is to determine whether the measure of the thickness has to be assigned to a first layer that has been crossed twice, to the first layer that has been crossed n times, to a second or third layer, or to the first layer added to the second layer, etc.).

According to a preferred embodiment, the measuring device 11 can provide for each rough thickness value RTW a corresponding quality factor MF on the basis, for example, of the ratio between the specific luminous power and the overall luminous power. Indeed, the quality factor is one of the clues suggesting that the associated reading corresponds to the thickness to be measured. At the end of each reading the measuring device 11 arranges all the determined rough thickness values RTW as a function of the corresponding quality factors MF that are available, and provides the processing unit 13 only with the three rough thickness values RTW that have the highest quality factors. For determining the actual value of the thickness T of the slice 2 of semiconductor material, the processing unit 13 uses a plurality of consecutive readings (typically the number of readings corresponding to a complete rotation of the slice 2 of semiconductor material) carried out by the measuring device 11, and thus considers a plurality of rough thickness values RTW (each readings carried out by the measuring device 11 can provide, for example and as mentioned above, three rough thickness values RTW with the associated quality factors MF). As an example, FIG. 3 is a graph showing the distribution of a plurality of rough thickness values RTW that have been provided by a plurality of consecutive readings carried out by the measuring device 11 (in FIG. 3 the ordinate represents the thickness value expressed in micron and the abscissa represents the time expressed in milliseconds).

As an example again, in an application where the slice 2 rotates at a speed of about 300 RPM and the measuring device has a data capture frequency of 4 KHz, the number of processed readings is 800 that correspond—in the above mentioned case where three values RTW are provided for each reading—to 2400 rough thickness values RTW.

The processing unit 13 can determine the actual value of the thickness T of the slice 2 of semiconductor material by analyzing the plurality of rough thickness values RTW provided by a plurality of consecutive readings carried out by the measuring device 11.

Figure 4A:
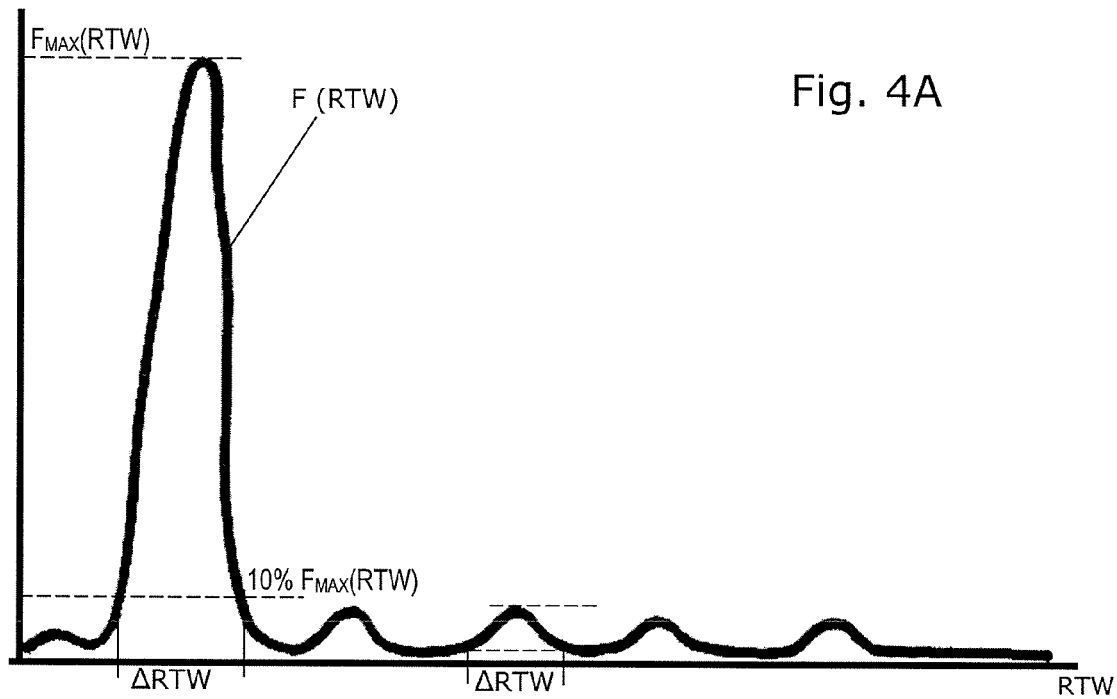
FIG. 4A is a curve representing the distribution of the frequencies of the rough thickness values of the graph in FIG. 3.

The processing unit 13 evaluates the frequencies (number of occurrences) of the rough thickness values RTW and the distribution of such frequencies. According to a first implementation procedure, first of all a variability interval of rough thickness values RTW is determined so that it is wide enough to include a significant part of such values RWT. Then, the processing unit 13 provides and processes a continuous function F(RTW) representing the frequency density of the values within the above-mentioned variability interval, and calculates the relative frequency density function. FIG. 4A shows, for example, a curve relating to such a function F(RTW) of the rough thickness values RTW of the graph in FIG. 3.

According to a different, preferred implementation procedure to which reference is made for the most part in the subsequent description, in an early stage the processing unit 13 defines the above-mentioned variability interval of the rough thickness values RTW by determining a plurality of thickness classes C that is large enough to include a significant part of the rough thickness values RTW. The resolution of the thickness classes C (that is the wideness of each thickness class C) is preferably of the order of magnitude of micron.

Figure 4B:
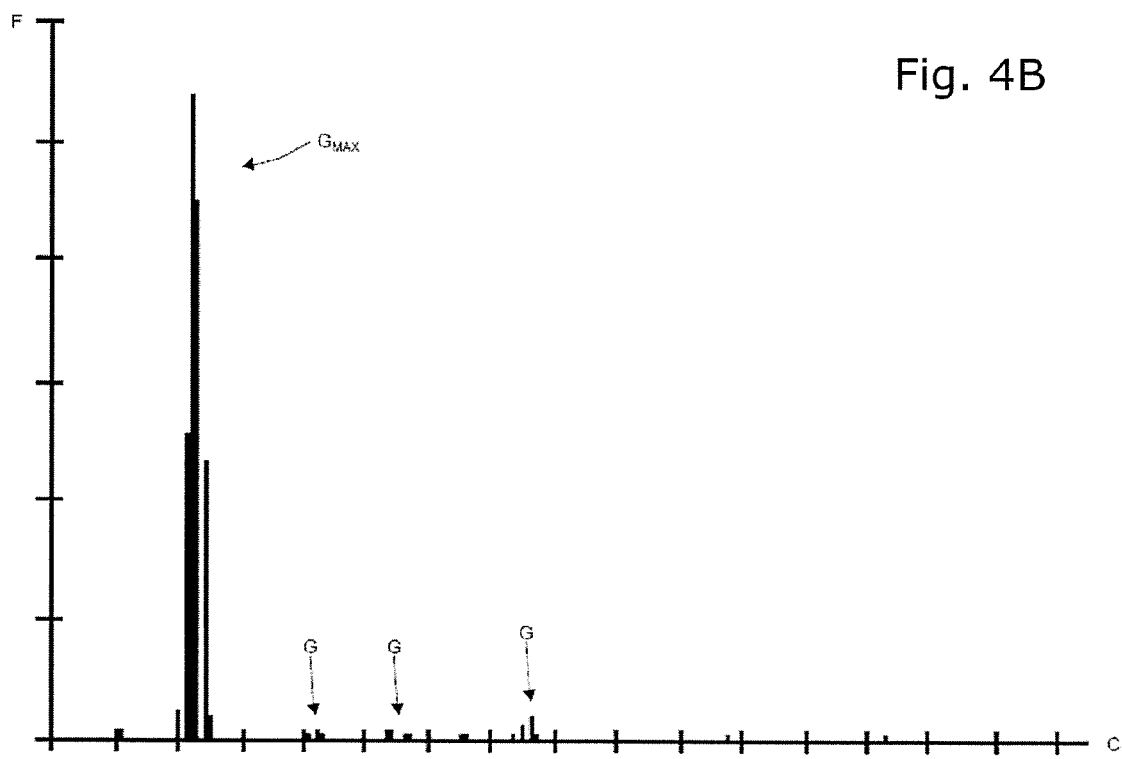
FIG. 4B is a histogram showing the rough thickness values of the graph in FIG. 3 divided up into a number of thickness classes, and relative frequencies, substantially indicating how many occurrences of the rough thickness values fall within each of such thickness classes.

Subsequently, the processing unit 13 evaluates the frequencies by means of a classification of the rough thickness values RTW so as to determine for each thickness class C the corresponding frequency F with which the rough thickness values RTW fall within that thickness class C, i.e. how often the rough thickness values (RTW) fall within that thickness class (C). In other words, for each thickness class C the processing unit 13 determines how many occurrences of the rough thickness values RTW are included in that thickness class C: the number of occurrences of rough thickness values RTW included in that thickness class C represents the frequency F with which the rough thickness values RTW fall within that thickness class C. As an example, FIG. 4B is a histogram that shows the frequency F indicating how many of the rough thickness values RTW of the graph in FIG. 3 fall within a series of thickness classes C with a resolution of 1 micron (in FIG. 4B the ordinate represents the frequency F and the abscissa represents the thickness classes C). Instead of the absolute frequency F (number of occurrences), it is possible to use a specific frequency or density (that is one frequency per unit of length) that is achieved by dividing the absolute frequency F by the wideness of the thickness class C.

According to a preferred embodiment, the processing unit 13 determines the frequencies F with which the rough thickness values RTW fall within the thickness classes C by considering the quality factors MF so that the weight assigned to each rough thickness value RTW provided by the measuring device 11 is greater than the one corresponding to a simple occurrence, and increases as the quality factor MF increases. In other words, a rough thickness value RTW with a high quality factor MF has more weight in calculating the frequency F of the corresponding thickness classe C than a rough thickness value RTW with a low quality factor MF. In this way, more importance is given to the rough thickness values RTW with higher quality factors MF and thus to the rough thickness values RTW that more probably refers to the thickness to be measured.

A similar weighting procedure of the frequencies of the values RTW with the relative quality factors MF can be carried out in case of using the continuous function that has been mentioned with reference to FIG. 4A.

According to said first implementation procedure, the subsequent step consists in determining among different, limited intervals of the function F(RTW)—on the abscissa axis of FIG. 4A—i.e. limited sets of adjacent rough thickness values RTW, the limited interval at which a frequency integration or summation, in particular the integral of the function F(RTW), represents an absolute maximum, and determining the actual value of the thickness T of the slice 2 of semiconductor material as a function of the values RTW of said limited set of adjacent values.

Likewise, in the preferred implementation procedure to which FIG. 4B refers, once the rough thickness values have been classified, the processing unit 13 determines a preponderant group $G_{MAX}$ of thickness classes C that is composed of one or more adjacent thickness classes C, for which the sum of the corresponding frequencies F represents an absolute maximum (as shown in the histogram of FIG. 4B). In substance, according to said preferred implementation procedure, the preponderant group $G_{MAX}$ of thickness classes C comprises and defines the limited set of adjacent rough thickness values RTW whose frequency integration or summation represents an absolute maximum, and thus the processing unit 13 determines the actual value of the thickness T of the slice 2 of semiconductor material as a function of the preponderant group $G_{MAX}$ of thickness classes C. In other words, among all the frequencies F (that is the frequencies inside the histogram) the processing unit 13 determines all the existing groups G (that is all the sets of adjacent thickness classes C whose relative frequencies F are significantly not null) and recognizes the preponderant group $G_{MAX}$ of thickness classes C by comparing all the existing groups G. For recognizing the preponderant group $G_{MAX}$ of thickness classes C the processing unit 13 calculates the sum of the frequencies F of all the groups G and searches the highest sum of the frequencies F (that is the absolute maximum of the frequency integration or summations).

Generally, the preponderant group $G_{MAX}$ of thickness classes C includes a plurality of adjacent thickness classes C, but it can even include just a single thickness class C.

As illustrated in FIG. 5, for determining a group G of thickness classes C (and thus the preponderant group $G_{MAX}$ of thickness classes C, too) the processing unit 13 determines, at the beginning, the thickness class $C_{MAX}$ that has the highest frequency $F_{MAX}$ in a local area (i.e. that locally represents a relative maximum within a relatively high interval of thickness classes C), and thus joins to such thickness class $C_{MAX}$ the adjacent thickness classes C (which are the thickness classes C "on the left" and "on the right") that have a relatively high frequency F. For example, a group G of thickness classes C is formed by joining to the thickness class $C_{MAX}$ with the highest frequency $F_{MAX}$ all the adjacent thickness classes C with a frequency F that is equal at least to the 10% of the frequency $F_{MAX}$ of the thickness class $C_{MAX}$ (or to a different preset percentage, for example 12.5% or 6.25%). What has been described hereinbefore is illustrated, as an example, in FIG. 5 showing in an enlarged scale a detail of the histogram of the FIG. 4B. FIG. 5 shows the thickness class $C_{MAX}$ with the highest frequency $F_{MAX}$ and a horizontal dashed line indicates the frequency limit that is equal, for example, to the 10% of the frequency $F_{MAX}$ (of the thickness class $C_{MAX}$. The thickness classes C that are adjacent to the thickness class $C_{MAX}$ and have a frequency F higher than the 10% of the frequency $F_{MAX}$ of the thickness class $C_{MAX}$ (marked with grey colour) are joint to the thickness class $C_{MAX}$, whereas the thickness classes C that are adjacent to the thickness class $C_{MAX}$ and have a frequency F lower than the 10% of the frequency $F_{MAX}$ of the thickness class $C_{MAX}$ are not joint to the thickness class $C_{MAX}$.

It is to be noted that, according to the above-mentioned first implementation procedure (FIG. 4A), the limited intervals of the function F(RTW), or limited sets of adjacent rough thickness values RTW, can be determined in a similar manner, i.e. by detecting highest frequencies $F_{MAX}$ (RTW) and defining intervals or "windows" ΔRTW (FIG. 4A) delimited by rough thickness values RTW whose frequency is equal to about 10% (for instance) of the relative highest frequencies $F_{MAX}$ (RTW).

In the histogram of the preferred implementation procedure to which FIG. 4B refers it is possible to identify more thickness classes $C_{MAX}$ that have locally the highest frequency $F_{MAX}$ (that is a series of "relative maxima"). In this case the processing unit 13 determines for each thickness class $C_{MAX}$ that has locally the highest frequency $F_{MAX}$ the corresponding group G of thickness classes C, calculates for each group G of thickness classes C the frequency integration or summation, more specifically the sum of the corresponding frequencies F (that is the sum of the frequencies F of all the thickness classes C belonging to the group G of thickness classes C), and finally identifies the preponderant group $G_{MAX}$ of thickness classes C that has the highest sum of the corresponding frequencies F.

According to a preferred embodiment, the processing unit 13 determines the actual value of the thickness T of the slice 2 of semiconductor material by averaging the rough thickness values RTW belonging to the thickness classes C of the preponderant group $G_{MAX}$ of thickness classes C.

According to a different embodiment, the processing unit 13 determines, in the preponderant group $G_{MAX}$ of thickness classes C, the thickness class $C_{MAX}$ that has the highest frequency $F_{MAX}$, and defines that the actual value of the thickness T of the slice 2 of semiconductor material is equal to the average of all the rough thickness values RTW belonging to the thickness class $C_{MAX}$ that has the highest frequency $F_{MAX}$.

It should be noted that the slice 2 of semiconductor material is in continuous motion during the readings of the measuring device 11 owing to the rotation of the rotary table 5 about the rotation axis 6. Therefore, the rough thickness values RTW that are read by the measuring device 11 and are considered in the processing algorithm do not refer to the same point of the slice 2 of semiconductor material but to a series of points of the slice 2 of semiconductor material placed along a circumference arc (whose angle has generally a size of at least 36°, corresponding to a tenth of a round angle, and can reach even 360° that is a round angle). Within said circumference arc the thickness T of the slice 2 of semiconductor material is not generally constant owing to, for example, the possible unevenness of the material. As a consequence, the reading of the rough thickness values RTW along a circumference arc enables to determine not only the actual value of the thickness T representing an average of the thickness T along the circumference arc but also a minimum $T_{min}$ and a maximum $T_{max}$ of the actual value of the thickness T of the slice 2 of semiconductor material along the circumference arc that represent how the actual value of the thickness T can vary along the circumference arc.

In general, the processing unit 13 determines the minimum $T_{min}$ and the maximum $T_{max}$ of the actual value of the thickness T of the slice 2 of semiconductor material, i.e. it determines the amplitude $\Delta T$ of the variation range of the actual value of the thickness T of the slice 2 of semiconductor material, because such data can be useful to correctly control the machining carried out by the grinding tool 9. The minimum $T_{min}$ and the maximum $T_{max}$ of the actual value of the thickness T of the slice 2 of semiconductor material represent the two extremes delimiting the variation range of the actual value of the thickness T of the slice 2 of semiconductor material that has an amplitude $\Delta T$ (where $\Delta T = T_{max} - T_{min}$).

According to a first embodiment the processing unit 13 determines the minimum $T_{min}$ and the maximum $T_{max}$ of the actual value of the thickness T of the slice 2 of semiconductor material, i.e. it determines the amplitude $\Delta T$ of the variation range of the actual value of the thickness T of the slice 2 of semiconductor material as a function of a minimum and a maximum of the rough thickness values RTW belonging to the preponderant group $G_{MAX}$ of thickness classes C. Said minimum and maximum can be estimated, for example, on the basis of processing on the standard deviation in the distribution of such rough thickness values RTW. In other words, the rough thickness value that is estimated to be the lowest among the rough thickness values RTW belonging to the preponderant group $G_{MAX}$ of thickness classes C represents the minimum $T_{min}$ of the actual value of the thickness T of the slice 2 of semiconductor material, whereas the rough thickness value that is estimated to be the highest among the rough thickness values RTW belonging to the preponderant group $G_{MAX}$ of thickness classes C represents the maximum $T_{max}$ of the actual value of the thickness T of the slice 2 of semiconductor material. Such a method is typically applied when the rough thickness values RTW used for a single measurement of the thickness T of the slice 2 of semiconductor material are read along a long circumference arc (whose length is close or equal to the round angle).

According to an alternative embodiment, when the rough thickness values RTW used for a single measurement of the thickness T of the slice 2 of semiconductor material are read along a short circumference arc (whose angle size, for example, is equal to 1/10 of the round angle, that is equal to 36°) more consecutive measures of the thickness T of the slice 2 of semiconductor material are considered for determining the minimum $T_{min}$ and the maximum $T_{max}$ of the actual value of the thickness T of the slice 2 of semiconductor material, that is for determining the amplitude $\Delta T$ of the variation range of the actual value of the thickness T of the slice of semiconductor material. In this case, the minimum $T_{min}$ and the maximum $T_{max}$ of the actual value of the thickness T of the slice 2 of semiconductor material, that is the amplitude $\Delta T$ of the variation range of the actual value of the thickness T of the slice of semiconductor material, are determined as a function of the minimum and the maximum of the actual values of the thickness T of the slice 2 of semiconductor material that are determined by the sequence of measures of the thickness T of the slice 2 of semiconductor material (i.e. the minimum $T_{min}$ and the maximum $T_{max}$ of the actual value of the thickness T of the slice 2 of semiconductor material are equal to the minimum $T_{min}$ and the maximum $T_{max}$ of the actual values of the thickness T of the slice 2 of semiconductor material, respectively). The sequence of measures of the thickness T of the slice 2 of semiconductor material that are considered to determine the minimum $T_{min}$ and the maximum $T_{max}$ of the actual value of the thickness T of the slice 2 of semiconductor material has to correspond to a complete rotation of the slice 2 of semiconductor material in order to provide a completely reliable result.

According to a preferred embodiment, a minimum quality threshold $MT_{min}$ that is stored in a memory of the processing unit 13 is determined. Before classifying the rough thickness values RTW, the processing unit 13 eliminates (rejects) all the rough thickness values RTW whose quality factors MF are lower than the minimum quality threshold $MT_{min}$. In this way, rough thickness values RTW with too low quality factors MF (and thus possibly affected by even remarkable measuring errors) are not considered in determining the actual value of the thickness T of the slice 2 of semiconductor material. If, for example, the range of the quality factors MF extends from 0 to 100, rough thickness values RTW with a quality factor MF lower than 30 or 20 can be rejected.

According to a preferred embodiment, the processing unit 13 sets a lower reject threshold $R_{min}$ and a higher reject threshold $R_{max}$ that define a searching interval including the actual value of the thickness T of the slice 2 of semiconductor material and it eliminates (rejects) all the rough thickness values RTW that are lower than the lower reject threshold $R_{min}$ and higher than the higher reject threshold $R_{max}$. In other words, the searching interval defined by the lower reject threshold $R_{min}$ and the higher reject threshold $R_{max}$ defines where the actual value of the thickness T of the slice 2 of semiconductor material has to be searched so as to narrow the searching area.

During the superficial machining of the slice 2 of semiconductor material causing a gradual reduction of the thickness T of the slice 2 of semiconductor material, the processing unit 13 progressively updates the lower reject threshold $R_{min}$ and the higher reject threshold $R_{max}$ for "following" the gradual reduction of the thickness T of the slice 2 of semiconductor material, as a function of the progress state of the surface machining of the slice 2 of semiconductor material. What has been described above is illustrated in the graph of FIG. 6 showing the evolution over time of the thickness T of the slice 2 of semiconductor material during the surface machining, and thus the evolution over time of the lower reject threshold $R_{min}$ and the higher reject threshold $R_{max}$.

According to a first embodiment, the processing unit 13 determines the progress state of the surface machining of the slice 2 of semiconductor material as a function of the machining process (which, as previously stated, controls the progress state of the surface machining), and thus progressively updates the lower reject threshold $R_{min}$ and the higher reject threshold $R_{max}$ as a function of the progress state of the surface machining. In particular, the machining process defines a material removal rate VA (that is, the material thickness that is removed per unit of time). Hence, knowing that the thickness T of the slice 2 of semiconductor material takes a value $T_{PC}$ at a control instant of time $t_{PC}$ (that typically corresponds to the last change in the material removal rate VA), it is easier to progressively update the reject thresholds $R_{min}$ and $R_{max}$ by using the following equations:

$$R_{min}(t) = T_{PC} - VA^*(t-t_{PC}) - M_{SC} \quad [1]$$

$$R_{max}(t) = T_{PC} - VA^*(t-t_{PC}) + M_{SC} \quad [2]$$

$R_{min}$ (t) lower reject threshold at the instant of time t;
$R_{max}$ (t) higher reject threshold at the instant of time t;
$T_{PC}$ value of the thickness T of the slice 2 of semiconductor material at a control instant of time $t_{PC}$;
$t_{PC}$ control instant of time;
VA material removal rate;
$M_{SC}$ maximum deviation between the theoretical removal of material and the actual removal of material (generally preset by means of experimental tests).

According to a second embodiment, measurements of the thickness T of the slice 2 of semiconductor material are carried out in a sequence, and the processing unit 13 updates the lower reject threshold $R_{min}$ and the higher reject threshold $R_{max}$ used for the current measurement of the thickness T as a function of the actual value of the thickness T determined at the end of the preceding measurement of the thickness T. Preferably, the processing unit 13 determines, according to the above described method, at each measurement of the thickness T of the slice 2 of semiconductor material the amplitude ΔT of the variation range of the actual value of the thickness T of the slice 2 of semiconductor material, too, and sets the lower reject threshold $R_{min}$ and the higher reject threshold $R_{max}$, used for the current measurement of the thickness T of the slice 2 of semiconductor material, by subtracting from and adding to, respectively, the actual value of the thickness T determined at the end of the preceding measurement half the amplitude ΔT of such variation range of the actual value of the thickness T determined at the end of the preceding measurement, to which a safety coefficient KS (in the order of 10-30%) can be added or not. In other words, the reject thresholds $R_{min}$ and $R_{max}$ can be updated by using the following equations:

$$R_{min-i} = T_{i-1} - (\Delta T_{i-1}/2)^*(1+KS) \quad [3]$$

$$R_{max-i} = T_{i-1} + (\Delta T_{i-1}/2)^*(1+KS) \quad [4]$$

$R_{min-i}$ lower reject threshold used for the i-th measurement of the thickness T of the slice 2 of semiconductor material;
$R_{max-i}$ higher reject threshold used for the i-th measurement of the thickness T of the slice 2 of semiconductor material;
$T_{i-1}$ actual value of the thickness T of the slice 2 of semiconductor material determined at the end of the (i−1)-th measurement;
$\Delta T_{i-1}$ amplitude of the variation range of the actual value of the thickness T of the slice 2 of semiconductor material determined at the end of the (i−1)-th measurement;
KS safety coefficient.

According to an alternative embodiment, it is possible to choose a distance between the reject thresholds $R_{min}$ and $R_{max}$ that is bigger or smaller than the above mentioned amplitude ΔT of the variation range.

As the reject thresholds $R_{min}$ and $R_{max}$ are not static (i.e. always constant) but dynamic (that is they continuously vary to follow the evolution over time of the actual value of the thickness T of the slice 2 of semiconductor material), the reject thresholds $R_{min}$ and $R_{max}$ are particularly effective in eliminating the rough thickness values excluded from the processing for calculating the thickness T, and thus in increasing the efficiency of said processing and the accuracy in determining the actual value of the thickness T. Such a result can be achieved because the reject thresholds $R_{min}$ and $R_{max}$ are dynamic and they can thus define a particularly narrow acceptability interval.

When the first measurement of the thickness T of the slice 2 of semiconductor material is carried out, there are no preceding measures available to which reference can be made for determining the lower reject threshold $R_{min}$ and the higher reject threshold $R_{max}$. Therefore, when the first measurement of the thickness T of the slice 2 of semiconductor material is carried out, the employed values of the lower reject threshold $R_{min}$ and the higher reject threshold $R_{max}$ are predetermined and calculated as a function of the nominal features of the slice 2 of semiconductor material and of the tolerances of the nominal features. Typically, the initial and predetermined values of the reject thresholds $R_{min}$ and $R_{max}$ calculated as a function of the nominal features enclose a wide interval that is gradually reduced as more measures of the actual value of the thickness T of the slice 2 of semiconductor material are available. According to a possible, particular solution, at the beginning the initial, wide interval included between the reject thresholds $R_{min}$ and $R_{max}$ remains valid until a predetermined persistence of the initial measuring value is detected. For example, the first measuring value generated by the algorithm is obtained when it persists for at least N consecutive times (where N=100 for example) featuring small variations, not extending outside a limited, predetermined range (3 micron, for example), and in this phase the reject thresholds $R_{min}$ and $R_{max}$ continue to be determined on the basis of the original, theoretical thickness and of its tolerance. This particular solution serves to provide more reliability to the initial value that is the basis on which the values of the subsequent automatic limits are determined.

According to a preferred embodiment, after rejecting the rough thickness values RTW that do not comply with the two rejection criteria (i.e. which are lower than the lower reject threshold $R_{min}$, higher than the higher reject threshold $R_{max}$, or have a quality factor MF lower than the minimum quality threshold $MT_{min}$) the processing unit 13 determines an acceptability percentage A % representing the number of rough thickness values RTW that comply with the rejection criteria (i.e. surviving after rejections based on the rejection criteria) in comparison with the total number of available rough thickness values RTW. Moreover, the processing unit 13 determines the actual value of the thickness T of the slice 2 of semiconductor material only if the acceptability percentage A % is higher than a representativeness threshold RT. Such condition ensures that the actual value of the thickness T of the slice 2 of semiconductor material is determined only if it is possible to use a significant number of rough thickness values RTW. In fact, the use of a too lower number of rough thickness values RTW causes the risk of making not negligible mistakes in determining the thickness T of the slice 2 of semiconductor material.

When the actual value of the thickness T of the slice 2 of semiconductor material can not be determined as the acceptability percentage A % is not higher than a representativeness threshold RT, the processing unit 13 preferably modifies at least one rejection criterion of the rough thickness values RTW for trying to increase the acceptability percentage A %. Typically, if the acceptability percentage A % is lower than the representativeness threshold RT even after at least one rejection criterion has been modified, the processing unit 13 does not determine the actual value of the thickness T of the slice 2 of semiconductor material and signals a missed measurement.

According to a possible embodiment, the processing unit 13 determines, by analyzing a series of consecutive measures of the thickness T of the slice 2 of semiconductor material, at least one possible parasitic thickness value that always remains substantially constant and a relative average number of rough thickness values RTW of the parasitic thickness value that belong to the thickness class C corresponding to the parasitic thickness value. Hence, after determining the parasitic thickness value, the processing unit 13 removes from the thickness class C corresponding to the parasitic value the average number of rough thickness values RTW of the parasitic thickness value. In this way it is possible to eliminate the influence of the parasitic values that can have negative effects when the actual value of the thickness T of the slice 2 of semiconductor material crosses, when decreasing, a parasitic value.

What described before is exemplified in FIGS. 7a to 7d: comparing the four FIGS. 7a, 7b, 7c and 7d it can be understood that there are a preponderant group $G_{MAX}$ of thickness classes C and two minority groups $GP_1$ and $GP_2$ of thickness classes C. The preponderant group $G_{MAX}$ of thickness classes C gradually displaces over time toward lower values owing to the surface machining carried out by the grinding tool 9, whereas the two minority groups $GP_1$ and $GP_2$ of thickness classes C always remain substantially constant over time. The processing unit 13 recognizes that the two minority groups $GP_1$ and $GP_2$ of thickness classes C always remain substantially constant over time, and thus they can not represent the thickness T of the slice 2 of semiconductor material that has to decrease over time owing to the surface machining carried out by the grinding tool 9. When the preponderant group $G_{MAX}$ of thickness classes C crosses (i.e. overlaps) the minority group $GP_2$ of thickness classes C, the preponderant group $G_{MAX}$ is "deformed" by the minority group $GP_2$ (as shown in FIG. 7b). In order to avoid such "deformation", the processing unit 13 eliminates the minority group $GP_2$ that overlaps the preponderant group $G_{MAX}$ (as shown in FIG. 7c) when the minority group $GP_2$ crosses the preponderant group $G_{MAX}$.

As stated above, for determining the actual value of the thickness T of the slice 2 of semiconductor material the processing unit 13 uses a plurality of consecutive readings carried out by the measuring device 11, and thus considers a plurality of rough thickness values RTW (each reading carried out by the measuring device 11 provides, for example, a single rough thickness value RTW or, according to the hereinbefore mentioned embodiment, three rough thickness values RTW). According to a preferred embodiment, each measurement of the thickness T of the slice 2 of semiconductor material uses a predetermined and constant number of readings of the thickness T within a measuring time interval. Between two consecutive measurements the processing unit translates over time the measuring time interval by an extent that is smaller than the extent of the measuring time interval itself so that a number of readings of the thickness T belong to both the end part of the preceding measurement and the initial part of the subsequent measurement.

The above described method for optically measuring by interferometry the thickness T of the slice 2 of semiconductor material is based on the hypothesis that the rough thickness values RTW corresponding to the thickness T of the slice 2 of semiconductor material are considerably more frequent than all the other values and/or have quality factors MF that are, on average, higher than all the other ones. Many experimental tests have proved that such hypothesis is correct, and thus the above described method is reliable.

In a different method according to the invention, the thickness T can be determined at the beginning in a way differing from the one hereinbefore described, for example, on the basis of the quality factor MF according to a known way, or by considering rough thickness values RTW that are closer than other values detected to a theoretical, preset thickness value. In such a different method according to the invention, the minimum reject threshold $R_{min}$ and the maximum reject threshold $R_{max}$ are, however, defined in a dynamic way, for example by using one of the methods hereinbefore described.

The above described methods for optically measuring by interferometry the thickness T of a slice 2 of semiconductor material, or of an object made of a different material that is at least partially transparent to the used light radiations, provide a lot of advantages.

First of all, the above described methods enable to rapidly and accurately determine the actual value of the thickness T of the slice 2 of semiconductor material. Indeed, many experimental tests have demonstrated that the above described methods enable to determine the actual value of the thickness T of the slice 2 of semiconductor material with small errors.

Moreover, the above described methods do not require any external intervention for adjusting the operational parameters. On the contrary, such methods can adjust autonomously and without external intervention to the specific features of the current measurement for providing the greatest accuracy in each situation. As a consequence, the above described methods are particularly suitable to be used in a production line during the serial production.

Finally, the above described methods neither require a high processing power nor take up much storage space. Therefore, they can be easily and cheaply implemented even in an existing processing unit 13 (that can thus be easily updated), which can be even integrated into the control unit 14.

The invention claimed is:

1. A method for optically measuring by interferometry the thickness of an object, the method including the steps of:
   carrying out by optical interferometry a plurality of readings of the thickness of the object for obtaining at least one rough thickness value from each reading and, consequently, a plurality of rough thickness values; and
   determining the actual value of the thickness of the object by analyzing the plurality of rough thickness values;
   wherein the method further includes the steps of:
   defining a variability interval of the rough thickness values that is wide enough to comprise at least one significant part of the rough thickness values;
   evaluating the frequencies of the rough thickness values of said variability interval;
   identifying a limited set of adjacent rough thickness values whose frequency integration or summation represents an absolute maximum; and determining the actual value of the thickness of the object as a function of the rough thickness values belonging to said limited set of values.

2. The method according to claim 1 wherein
the step of evaluating the frequencies of the rough thickness values of said variability interval comprises the processing of a continuous function representing the frequency density of the rough thickness values and the calculation of the relative frequency density function;
said limited set of adjacent rough thickness values defining a limited interval and said frequency integration or summation being defined as the integral of said continuous function in said limited interval.

3. The method according to claim 1 wherein
the step of defining a variability interval of the rough thickness values includes the determination of a plurality of thickness classes that is large enough to comprise a significant part of the rough thickness values;
the step of evaluating the frequencies of the rough thickness values of said variability interval comprises a classification of the rough thickness values so as to determine for each thickness class a corresponding frequency indicating how often the rough thickness values fall within that thickness class;
the method further comprising the step of determining a preponderant group of thickness classes that is composed of one or more adjacent thickness classes for which the sum of the corresponding frequencies defines said frequency integration or summation representing an absolute maximum, said limited set of adjacent rough thickness values being defined by said preponderant group of thickness classes.

4. The method according to claim 3 and further comprising the additional steps of
determining in the preponderant group of thickness classes the thickness class that has the highest frequency; and
determining the actual value of the thickness of the object as the average of the rough thickness values belonging to the thickness class that has the highest frequency.

5. The method according to claim 1 and including the further step of determining the actual value of the thickness of the object by averaging all the rough thickness values belonging to said limited set of adjacent rough thickness values.

6. The method according to claim 1 and including the further step of determining a minimum and a maximum of the actual value of the thickness of the object, i.e. determining the amplitude of a variation range of the actual value of the thickness of the object as a function of a minimum and a maximum of the rough thickness values belonging to said limited set of adjacent rough thickness values.

7. The method according to claim 1 and including the further steps of:
carrying out a sequence of measurements of the thickness of the object; and
determining a minimum and a maximum of the actual value of the thickness of the object, i.e. determining the amplitude of a variation range of the actual value of the thickness of the object as a function of a minimum and a maximum of the actual values of the thickness of the object determined by the sequence of measurements of the thickness of the object.

8. The method according to claim 7 and including the further steps of:
rotating the object about a rotation axis while carrying out the sequence of measurements of the thickness of the object; and
carrying out the sequence of measurements of the thickness of the object in such a way that the sequence of measurements is carried out throughout a complete rotation of the object about the rotation axis.

9. The method according to claim 1 and including the further steps of:
having a corresponding quality factor for each reading and each rough thickness value; and
determining the frequencies of the rough thickness values considering the quality factors so that the weight assigned to each rough thickness value increases as the quality factor increases.

10. The method according to claim 1 and including the further steps of:
having a corresponding quality factor for each reading and for each rough thickness value;
setting a minimum quality threshold; and
eliminating all the rough thickness values whose quality factors are lower than the minimum quality threshold.

11. The method according to claim 1 and including the further steps of:
setting a lower reject threshold and a higher reject threshold that identify a searching interval comprising the actual value of the thickness of the object; and
eliminating all the rough thickness values that are lower than the lower reject threshold and all the rough thickness values that are higher than the higher reject threshold.

12. The method according to claim 11 and including the further steps of:
machining the surface of the object so as to gradually reduce the thickness of the object according to a known machining process;
determining the progress state of the surface machining of the object as a function of the machining process; and
progressively updating the lower reject threshold and the higher reject threshold as a function of the progress state of the surface machining of the object.

13. The method according to claim 11 and including the further steps of:
carrying out measurements of the thickness of the object in a sequence; and
updating the lower reject threshold and the higher reject threshold that are used for the current measurement of the thickness of the object as a function of the actual value of the thickness of the object determined at the end of the preceding measurement of the thickness of the object.

14. The method according to claim 13 and including the further steps of:
determining, for each measurement of the thickness of the object, the amplitude of a variation range of the actual value of the thickness of the object; and
setting the lower reject threshold and the higher reject threshold that are used for the current measurement of the thickness of the object by subtracting from and adding to, respectively, the actual value of the thickness of the object determined at the end of the preceding measurement of the thickness of the object half the amplitude of the variation range of the actual value of the thickness of the object determined at the end of the preceding measurement of the thickness of the object.

15. A method for optically measuring by interferometry the thickness of an object during a surface machining of the object that gradually reduces the thickness of the object, the method including the steps of:
   carrying out by optical interferometry a plurality of readings of the thickness of the object for obtaining at least one rough thickness value from each reading and, consequently, a plurality of rough thickness values;
   determining an actual value of the thickness of the object by analyzing the plurality of rough thickness values;
   setting a lower reject threshold and a higher reject threshold that define a searching interval comprising the actual value of the thickness of the object; and
   eliminating all the rough thickness values that are lower than the lower reject threshold and all the rough thickness values that are higher than the higher reject threshold;
   wherein the method further includes the step of:
   progressively updating the lower reject threshold and the higher reject threshold as a function of the gradual reduction of the thickness of the object.

16. The method according to claim 15, wherein the surface machining of the object that gradually reduces the thickness of the object takes place according to a known machining process, the method including the further steps of:
   determining the progress state of the surface machining of the object as a function of the machining law; and
   progressively updating the lower reject threshold and the higher reject threshold as a function of the progress state of the surface machining of the object.

17. The method according to claim 15 and including the further steps of:
   carrying out a sequence of measurements of the thickness of the object; and
   updating the lower reject threshold and the higher reject threshold that are used for the current measurement of the thickness of the object as a function of the actual value of the thickness of the object determined at the end of the preceding measurement of the thickness of the object.

18. The method according to claim 17 and including the further steps of:
   determining, for each measurement of the thickness of the object, the amplitude of a variation range of the actual value of the thickness of the object; and
   setting the lower reject threshold and the higher reject threshold that are used for the current measurement of the thickness of the object, by subtracting from and adding to, respectively, the actual value of the thickness of the object determined at the end of the preceding measurement of the thickness of the object half the amplitude of the variation range of the actual value of the thickness of the object determined at the end of the preceding measurement of the thickness of the object.

19. The method according to claim 1 and including the further steps of:
   determining a plurality of thickness classes that is large enough to comprise a significant part of the rough thickness values;
   classifying the rough thickness values so as to determine for each thickness class a corresponding frequency indicating how often the rough thickness values fall within that thickness class;
   determining a preponderant group of thickness classes that is composed of one or more adjacent thickness classes for which the sum of the corresponding frequencies defines an absolute maximum; and
   determining the actual value of the thickness the object as a function of the rough thickness values belonging to the preponderant group of thickness classes.

20. The method according to claim 19 and including the further step of determining the actual value of the thickness of the object by averaging all the rough thickness values belonging to the preponderant group of thickness classes.

21. The method according to claim 19 and including the further steps of:
   carrying out a sequence of measurements of the thickness of the object;
   determining, by analyzing a series of subsequent measurements, at least one possible parasitic thickness value that always remains constant in the series of subsequent measurements and a corresponding average number of rough thickness values of the parasitic thickness value that belong to the thickness class corresponding to the parasitic thickness value; and
   eliminating from the thickness class corresponding to the parasitic thickness value the average number of rough thickness values of the parasitic thickness value.

22. The method according to claim 15 and including the further steps of:
   having a corresponding quality factor for each reading and each rough thickness value;
   setting a minimum quality threshold; and
   eliminating all the rough thickness values whose quality factors are lower than the minimum quality threshold.

23. The method according to claim 15 and including the further steps of:
   determining at least one rejection criterion of rough thickness values;
   eliminating all the rough thickness values that do not comply with the rejection criterion;
   determining an acceptability percentage representing the number of rough thickness values that comply with the rejection criterion in comparison with the total number of available rough thickness values; and
   determining the actual value of the thickness of the object only if the acceptability percentage is higher than a representativeness threshold.

24. The method according to claim 15 claims and including the furthers steps of:
   carrying out a sequence of measurements of the thickness of the object, each of them using a predetermined and constant number of readings of the thickness of the object that are carried out by optical interferometry and are within a measuring interval; and
   translating over time, between two subsequent measurements, the measuring interval by an extent which is smaller than the extent of the measuring interval itself so that a number of readings of the thickness of the object carried out by interferometry belongs to both the end part of the preceding measurement and the initial part of the subsequent measurement.

25. The method according to claim 15, wherein the object is a slice of semiconductor material.

26. An apparatus for optically measuring by interferometry the thickness of an object, the apparatus including:
   a measuring device for thickness measurement by interferometry that carries out a plurality of readings of the thickness of the object for obtaining at least one rough thickness value from each reading and, consequently, a plurality of rough thickness values; and
   a processing unit that carries out a measuring method according to claim 15.

27. The method according to claim 3 and including the further steps of:
- carrying out a sequence of measurements of the thickness of the object;
- determining, by analyzing a series of subsequent measurements, at least one possible parasitic thickness value that always remains constant in the series of subsequent measurements and a corresponding average number of rough thickness values of the parasitic thickness value that belong to the thickness class corresponding to the parasitic thickness value; and
- eliminating from the thickness class corresponding to the parasitic thickness value the average number of rough thickness values of the parasitic thickness value.

28. The method according to claim 1 and including the further steps of:
- determining at least one rejection criterion of rough thickness values;
- eliminating all the rough thickness values that do not comply with the rejection criterion;
- determining an acceptability percentage representing the number of rough thickness values that comply with the rejection criterion in comparison with the total number of available rough thickness values; and
- determining the actual value of the thickness of the object only if the acceptability percentage is higher than a representativeness threshold.

29. The method according to claim 1 and including the further steps of:
- carrying out a sequence of measurements of the thickness of the object, each of them using a predetermined and constant number of readings of the thickness of the object that are carried out by optical interferometry and are within a measuring interval; and
- translating over time, between two subsequent measurements, the measuring interval by an extent which is smaller than the extent of the measuring interval itself so that a number of readings of the thickness of the object carried out by interferometry belongs to both the end part of the preceding measurement and the initial part of the subsequent measurement.

30. The method according to claim 1, wherein the object is a slice of semiconductor material.

31. An apparatus for optically measuring by interferometry the thickness of an object, the apparatus including:
- a measuring device for thickness measurement by interferometry that carries out a plurality of readings of the thickness of the object for obtaining at least one rough thickness value from each reading and, consequently, a plurality of rough thickness values; and
- a processing unit that carries out a measuring method according to claim 1.

* * * * *